(12) United States Patent
Elliott et al.

(10) Patent No.: US 7,295,513 B2
(45) Date of Patent: Nov. 13, 2007

(54) SCHEDULING OF WIRELESS PACKET DATA TRANSMISSIONS

(75) Inventors: Robert C. Elliott, Sherwood Park (CA); Witold A. Krzymien, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 703 days.

(21) Appl. No.: 10/669,151

(22) Filed: Sep. 23, 2003

(65) Prior Publication Data

US 2005/0063389 A1    Mar. 24, 2005

(51) Int. Cl.
G01R 31/08 (2006.01)
G06F 11/00 (2006.01)
G08C 15/00 (2006.01)

(52) U.S. Cl. .................. 370/229; 370/230; 370/231; 370/235

(58) Field of Classification Search ........ 370/229–235; 455/450, 452.1, 509, 510
See application file for complete search history.

(56) References Cited

U.S. PATENT DOCUMENTS

| | | | | |
|---|---|---|---|---|
| 5,903,554 | A * | 5/1999 | Saints ........................ | 370/342 |
| 6,052,408 | A * | 4/2000 | Trompower et al. ........ | 375/141 |
| 6,075,792 | A * | 6/2000 | Ozluturk ..................... | 370/441 |
| 6,091,717 | A * | 7/2000 | Honkasalo et al. ......... | 370/329 |
| 6,421,335 | B1 * | 7/2002 | Kilkki et al. ................ | 370/342 |
| 6,564,061 | B1 | 5/2003 | Guo et al. ................... | 455/453 |
| 6,590,890 | B1 | 7/2003 | Stolyar et al. .............. | 370/349 |
| 2002/0093976 | A1 | 7/2002 | Razoumov et al. ......... | 370/444 |
| 2002/0176380 | A1 | 11/2002 | Holtmann et al. .......... | 370/329 |
| 2003/0039213 | A1 | 2/2003 | Holtzmann et al. ......... | 370/252 |
| 2003/0081627 | A1 | 5/2003 | Bao et al. ................... | 370/444 |
| 2003/0133457 | A1 | 7/2003 | Ono et al. ............... | 370/395.4 |
| 2005/0129063 | A1 * | 6/2005 | Razoumov et al. ......... | 370/468 |
| 2005/0226199 | A1 * | 10/2005 | Kimura ..................... | 370/345 |

OTHER PUBLICATIONS

TIA/EIA/IS-856, *cdma2000 High Rate Packet Data Air Interface Specification*, Telecommunications Industry Association, Arlington, VA, Nov. 2000.
TIA/EIA/IS-2000.2-C, *Physical Layer Standard for cdma2000 Spread Spectrum Systems—Release C*, Telecommunications Industry Association, Arlington, VA, May 2002.
F. Kelly, "Charging and rate control for elastic traffic," *European Trans. on Telecommunications*, vol. 8, pp. 33-37, 1997.

(Continued)

*Primary Examiner*—Rafael Perez-Gutierrez
*Assistant Examiner*—Kwasi Karikari
(74) *Attorney, Agent, or Firm*—Christensen O'Connor Johnson Kindness PLLC

(57) ABSTRACT

A method for scheduling packet data transmissions in a wireless communication system is described wherein a priority function is based on a channel state indicator (CSI), the projected average throughput of the users, and a tuning parameter designed to control the throughput and fairness characteristics of the scheduling algorithm. The method also considers fairness criteria dictated by predetermined Quality of Service (QoS) requirements. The channel state indicator may be a Requested Data Rate (RDR) or Carrier-to-Interference ratio (C/I) information. The base station calculates a priority function for the multiple mobile users. Each priority function is a function of the CSI, the projected average throughput of a given mobile user, the average projected throughput over a set of users, and the tuning parameter.

19 Claims, 4 Drawing Sheets

OTHER PUBLICATIONS

A. Jalali, R. Padovani, and R. Pankaj, "Data throughput of CDMA-HDR a high efficiency-high data rate personal communication wireless system," in *Proc. IEEE Vehicular Technology Conf. (VTC 2000 Spring)*, Tokyo, Japan, May 2000, vol. 3, pp. 1854-1858.

J. M. Holtzman, "Asymptotic analysis of proportional fair algorithm," in *Proc. IEEE International Symposium on Pers., Indoor and Mobile Radio Commun. (PIMRC)*, San Diego, CA, Sep.-Oct. 2001, vol. 2, pp. F-33-F-37.

R. C. Elliott and W. A. Krzymien, "Scheduling algorithms for the cdma2000 packet data evolution," in *Proc. IEEE Vehicular Technology Conf. (VTC 2002-Fall)*, Vancouver, Canada, Sep. 2002, vol. 1, pp. 304-310.

D. W. Paranchych and M. Yavuz, "A method for outer loop rate control in high data rate wireless networks," in *Proc. IEEE Vehicular Technology Conf. (VTC 2002-Fall)*, Vancouver, Canada, Sep. 2002, vol. 3, pp. 1701-1705.

* cited by examiner

SCHEDULING OF WIRELESS PACKET DATA TRANSMISSIONS

BACKGROUND OF THE INVENTION

This invention relates to the field of wireless data communication. More specifically, this invention describes a novel and improved method and apparatus for scheduling packet data transmissions in a wireless data communication system.

In a wireless communication system, each of a plurality of base stations communicates with a set of mobile users. Such wireless communications could take the form of low-delay circuit-switched voice or video transmissions. Alternately, the communications could take the form of high bit rate packetized data transmissions. Examples of such high bit rate packet data systems include the TIA/EIA/IS-856 standard (cdma2000 High Rate Packet Data Air Interface Specification, Telecommunications Industry Association, Arlington, Va., November 2000) and the TIA/EIA/IS-2000.2 standard (Physical Layer Standard for cdma2000 Spread Spectrum Systems—Release C, Telecommunications Industry Association, Arlington, Va., May 2002).

In general, packet data transmissions are much more delay tolerant than real-time voice or video transmissions. Therefore, scheduling can be used at the base station in order to take advantage of the changing wireless channel conditions for each of the users requesting service from the base station. After performing scheduling, the base station can transmit packets to as few as one user at any given time. In general, the scheduling algorithm must attempt to meet two conflicting goals. First, the operator of the wireless system would wish to maximize the amount of data sent through the system in order to take full advantage of the system resources and thereby increase the revenue that the system would generate. However, maximizing the overall system throughput may result in a highly unequal distribution of service to the pool of mobile users. A small group of users could receive an excessive allocation of time or packets to the detriment of the service to the remaining users. Therefore, the scheduling algorithm must also provide a fair allocation of resources to all the mobile users.

SUMMARY OF THE INVENTION

In a method of scheduling transmissions for a group of mobile stations in a wireless communication system, a balance is found between high throughput for one mobile station, or a restricted set of mobile stations, and fairness within a larger group of mobile stations. The balance, according to one aspect of the invention, is achieved through use of a tuning parameter, which can be varied to alter the balance between high throughput for one or several mobile stations and fairness of a larger group of mobile stations. The tuning parameter forms part of a priority function for each mobile station, and variation of the tuning parameter changes the relative weights assigned during scheduling to the throughput for one mobile station and the average throughput for multiple mobile stations.

Thus, according to an aspect of the invention, in a wireless communication system designed to send packetized data transmissions, a method includes receiving a channel state indicator CSI from a mobile station, determining a tuning parameter $\alpha$ in the range of 0 to 1 inclusive, calculating a projected average throughput value $\overline{R}$ for each mobile station as a function of the CSI, calculating the average value $\overline{R}_{av}$ of the projected average throughput values for at least a portion of the pool of mobile stations, calculating a priority function for the mobile station, wherein the priority function is a function of $CSI \times [\alpha/\overline{R} + (1-\alpha)/\overline{R}_{av}]$, and sched transmissions to the mobile stations according to the priority functions.

According to one aspect, a method for scheduling packet transmissions in a wireless communication system includes determining a pool of users, determining a tuning parameter $\alpha$ in the range of 0 to 1 inclusive, calculating a priority function for at least a section of the pool of users, scheduling a first subset of users who have data transmissions pending from the section of the pool of users, receiving channel state indicators from the section of the pool of users, and updating the priority functions of the first subset of users based on the channel state indicators multiplied by a function of the tuning parameter, the projected average throughput for the first subset of users, and the average projected throughput value averaged across all users in the section of the pool of users.

In another aspect, the base station apparatus contains a processor, and a memory module coupled to the processor that stores a plurality of computer readable instructions. The memory module includes a first set of instructions to obtain channel state indicators CSI for the mobile stations, a second set of instructions to determine the value of a tuning parameter $\alpha$ within the range of 0 to 1 inclusive, a third set of instructions to calculate the projected average throughput values $\overline{R}$ for each mobile station as a function of the channel state indicator for that mobile, a fourth set of instructions to calculate the average value $\overline{R}_{av}$ of the projected average throughput values $\overline{R}$, a fifth set of instructions to calculate a priority function for the mobile stations, wherein the priority function is a function of $CSI \times [\alpha/\overline{R} + (1-\alpha)/\overline{R}av]$, and a sixth set of instructions to schedule transmissions to the mobile stations according to the priority functions.

BRIEF DESCRIPTION OF THE DRAWINGS

There will now be given a description of the drawings, by way of illustration only and not with the intent of limiting the invention, where like reference characters denote like elements, and where.

DETAILED DESCRIPTION OF PREFERRED EMBODIMENTS

Figure 1:
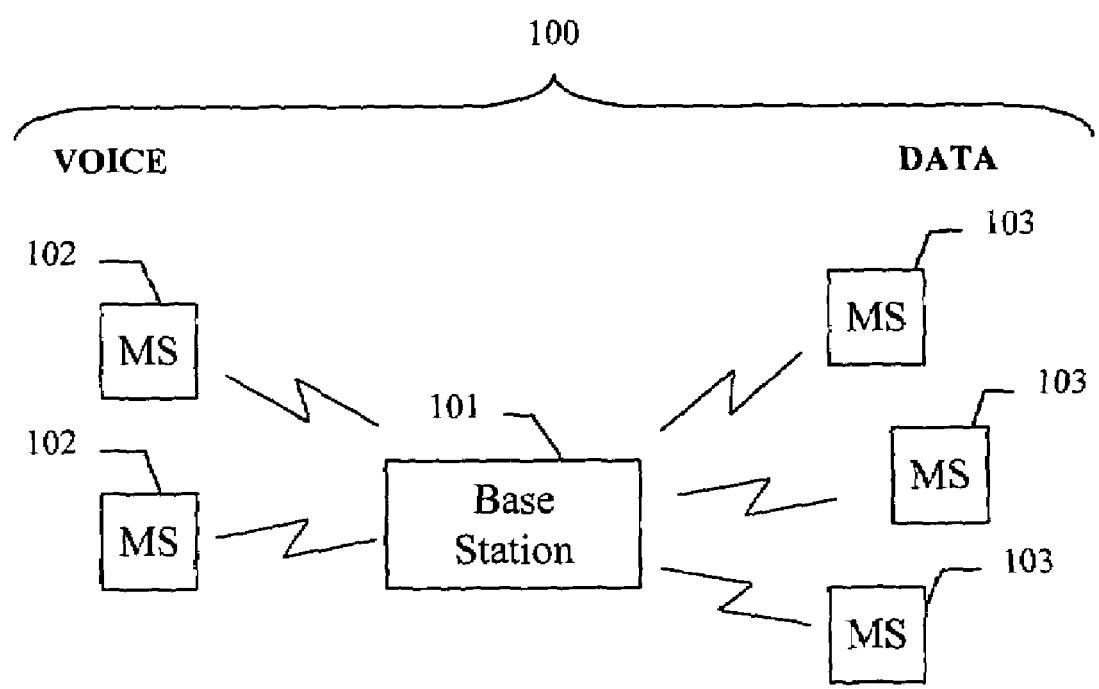
FIG. 1 illustrates in block diagram form a wireless communication system.

In this patent document, the word "exemplary" is used to mean "serving as an example, instance, or illustration". Any embodiment described herein as "exemplary" should not necessarily be construed as preferred or advantageous over other embodiments. In this patent document: the term CSI refers to a channel state indicator from a mobile station, $\alpha$ is a tuning parameter having a value in the range of 0 to 1 inclusive, $\overline{R}$ is a projected average throughput value for one or more mobile stations as a function of the CSI for those stations, $\overline{R}_{av}$ is the average of the projected average throughput values for at least a portion of the pool of mobile stations, and a priority function is a function used for priority scheduling of transmissions to at least a portion of a pool of mobile stations.

In an exemplary embodiment of this invention, a base station in a wireless communication system schedules packet transmissions to mobile stations based upon the instantaneous value of the priority function for each user. The priority that a user has to be scheduled for a packet transmission is related to the value of the priority function. The larger the value of the priority function for a user, the higher the priority that user has to be scheduled. In one aspect, a method for determining the values of the priority functions is based on the channel conditions as indicated by the channel state indicator (CSI). The method also considers fairness requirements as dictated by Quality of Service (QoS) specifications. In one embodiment, the CSI may take the form of a Requested Data Rate (RDR). In another embodiment, the CSI may be information regarding the Carrier-to-Interference ratio (C/I) as seen at the mobile stations. Other embodiments may use other forms of data rate or channel indicators or predictors for the CSI. In an exemplary embodiment, the base station calculates the value of a priority function for multiple mobile users. Each priority function is a function of the CSI, the projected average throughput of the given mobile user, the average value of the projected average throughput over a set of multiple mobile users, and a tuning parameter. The values of the priority function allow the base station to schedule transmissions to users who have data pending. An exemplary priority function is any function based on $CSI \times [\alpha/\overline{R} + (1-\alpha)/\overline{R}_{av}]$.

The tuning parameter $\alpha$ allows the throughput of the wireless communication system and the fairness of the scheduling algorithm to be adjusted. At one extreme according to the exemplary priority function, when $\alpha$ is equal to 0, the mobile user with the largest value of the priority function will be the mobile user with the largest value of the CSI, since the value $\overline{R}_{av}$ is the same for all mobile users at any point in time. In this case, since the mobile user with the largest CSI is the mobile user with the highest priority, the throughput of the wireless communication system would be maximized, since the largest CSI would correspond to the largest supportable data rate. However, associated with the large throughput is a low degree of fairness, since the other users who have lower priority would be scheduled for transmissions much less frequently. At the other extreme, when the tuning parameter $\alpha$ is equal to 1, the priority function for each user is equal to the CSI divided by the projected average throughput for that user. In this case, the algorithm is said to be proportionally fair, as discussed by F. Kelly in "Charging and rate control for elastic traffic," *European Trans. on Telecommunications*, vol. 8, pp. 33-37, 1997. The mobile user that has the highest value of the priority function will be at a peak of its channel conditions relative to the average channel conditions that user experiences. The resulting throughput of the wireless communication system would be smaller in this case, but the mobile users would be treated more fairly. The proportionally fair scheduling algorithm wherein the CSI is a Requested Data Rate (RDR) has been discussed by A. Jalali, R. Padovani, and R. Pankaj in "Data throughput of CDMA-HDR a high efficiency-high data rate personal communication wireless system," in *Proc. IEEE Vehicular Technology Conf.* (VTC 2000 Spring), Tokyo, Japan, May 2000, vol. 3, pp. 1854-1858, while the case of the CSI being a C/I value has been examined by J. M. Holtzman in "Asymptotic analysis of proportional fair algorithm," in *Proc. IEEE International Symposium on Pers., Indoor, and Mobile Radio Commun.* (PIMRC), San Diego, Calif., September-October 2001, vol. 2, pp. F-33-F-37. As the value of the tuning parameter changes, the system throughput and fairness would also change between the above two extremes. In an exemplary embodiment, this change could be made as the number of mobile users with data pending changes, or to satisfy certain QoS specifications. For example, the value could be low when there are only a few mobile users in the system, but could increase as the number of mobile users increases, and those users must compete for the available resources. Ideally, the throughput should change linearly between the two extremes with the value of the tuning parameter, as demonstrated by R. C. Elliott and W. A. Krzymien in "Scheduling algorithms for the cdma2000 packet data evolution," in *Proc. IEEE Vehicular Technology Conf* (VTC 2002-Fall), Vancouver, Canada, September 2002, vol. 1, pp. 304-310. For example, when $\alpha$ is equal to 0.5, the resulting throughput is approximately halfway between that achieved when $\alpha$ is equal to 0 and when $\alpha$ is equal to 1.

Associated with channel state indicator is an improvement in the adaptation to the changing channel conditions in order to reduce the adverse effects related to the assigned data rates. The assigned data rates themselves are quantized to a set of allowable and available formats within the wireless communication system. This results in a coarse adjustment of the data rates. The actual data rates that are achieved by the packet transmissions can be different than the nominal assigned rates due to a variety of factors. In the TIA/EIA/IS-856 standard, the nominal data rates for certain transmission formats are achieved when packet transmissions are repeated up to a given maximum number of attempts. However, it is possible for packets to be received correctly before that maximum number of attempts is made, leading to a higher actual data rate than the nominal value. Through the use of the CSI, the assigned data rates for each of the users is adjusted according to the requirements and operating conditions of the system and the instantaneous channel conditions of the users.

In the exemplary embodiment illustrated in FIG. 1, a wireless communication system 100 consists of at least one base station 101 that communicates with mobile stations 102 and mobile stations 103 over a wireless radio link. The base station 101 processes the transmissions for the mobile stations 102 and the mobile stations 103 separately. As shown, the transmissions of the mobile stations 102 are services that use low data rates and require real-time processing, such as voice communication. As such, the active communications between the base station 101 and the mobile stations 102 are handled simultaneously and concurrently. In contrast, the mobile stations 103 employ high data rate packet communications, which can be delayed and scheduled in order to take advantage of the changing wireless channel conditions. Hence, the communications between the base station 101 and the mobile stations 103 are not necessarily handled concurrently. That is, in one embodiment, although communications between the base station 101 and all the mobile stations 103 are handled on a continuous basis, only one packet transmission between the base station 101 and a single mobile station 103 may be allowed at any given point in time. In an alternate embodiment, transmissions to more than one of the mobile stations 103 may be allowed concurrently. Further, in other embodiments, the low latency communications of the mobile stations 102 may not be supported, with only the high rate packet transmissions of the mobile stations 103 being allowed at the base station 101.

Figure 2:
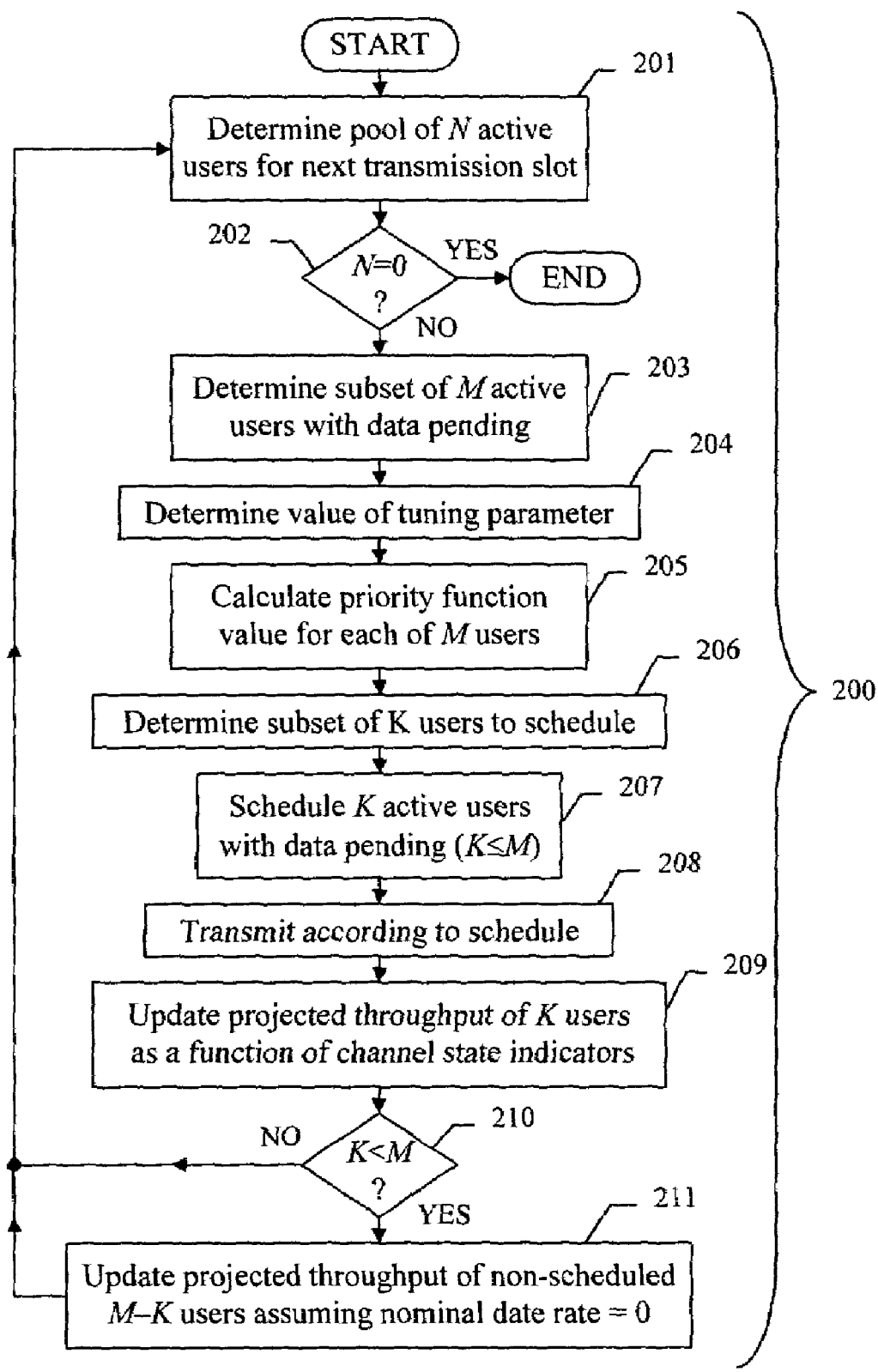
FIG. 2 illustrates in flow diagram form a method for scheduling packet data transmissions.

FIG. 2 illustrates a method 200 for scheduling the mobile stations 103 within the wireless system 100. To begin, a pool of active users within the wireless system 100 that are communicating with the base station 101 is determined at step 201. The total number of mobile stations 103, or users, in the pool is designated as "N". At step 202, if N is equal to zero, the process stops; otherwise, the process continues to step 203 and a subset of users "M" out of the pool of N users is determined, wherein the M active users have data pending to be transmitted. A value for the tuning parameter α is determined in the range of 0 to 1 inclusive in step 204. In one embodiment, α is a constant. In another embodiment, the value of α may depend on the number of users M in the subset of active users with data pending. For example, the value of α may increase as the number of users increases as the fair sharing of system resources takes precedence over throughput. Other techniques to determine the value of α may also be used, depending on the needs of the individual systems. In step 205, a priority function is then calculated for each of the M users according to the following equation:

$$P(j)=CSI(j)\times[\alpha \overline{R}(j)+(1-\alpha)/\overline{R}_{av}], \text{ for } j=1, \ldots, M \quad (1)$$

wherein j is a user index corresponding to the subset M of active users with pending data. The value $\overline{R}_{av}$ is the average of the projected average throughput $\overline{R}(j)$ across the subset M of users. Note that the projected throughput do not necessarily equal the actual throughput of the users. The actual throughput can be represented as T(j), although those actual throughput are not directly used in the calculation of (1).

In step 206, a further subset of "K" users to be scheduled for transmission is determined from the subset of M active users with data pending. In an exemplary embodiment, the determination of the subset of K users is dependent on the system configuration and the specific scheduling algorithm. Often, K=1, wherein the system transmits to only one user at any given point in time. However, K may have any value less than or equal to M. Note also that the K users are also a subset of the pool of N users, such that K≦M≦N. At step 207, the K users are actually scheduled for transmission based on the calculated values of the priority functions. The base station 101 then transmits packet data transmissions to the K users at step 208 according to the schedule of step 207. Transmission involves the determination of transmit power, power control, data rate, modulation, error correction coding, and other parameters of transmission. It should also be recalled that the base station 101 might also be transmitting low latency transmissions to mobile stations 102.

At step 209, the base station 101 updates the projected average throughput $\overline{R}$ for the K scheduled users according to a function of the channel state indicator of each scheduled user. In an exemplary embodiment, the projected average throughput update calculation is performed according to the following equation:

$$\overline{R}(k,n+1)=(1-\beta)\cdot \overline{R}(k,n)+\beta \cdot R(k,n), \text{ for } k=1, \ldots, K \quad (2)$$

The projected average throughput are updated using a low pass filter with a filter parameter β (0<β≦1) for users with index k and digital samples with time index n. The filter parameter is related to the time constant of the filter and controls the size of the window of past samples, over which the averaging of the projected throughput is performed. In one embodiment, the filter parameter β may be related to the QoS and/or the velocity for each mobile station 103. In another embodiment, the parameter β may be a constant. In the exemplary embodiment discussed by R. C. Elliott and W. A. Krzymien in "Scheduling algorithms for the cdma2000 packet data evolution," in *Proc. IEEE Vehicular Technology Conf* (VTC 2002-Fall), Vancouver, Canada, September 2002, vol. 1, pp. 304-310, the parameter β had a value of 0.001, which was selected to enable averaging out the effects of multipath fading. The value R(k) is the nominal projected data rate for user k, and is determined from the CSI. In an exemplary embodiment, the CSI may be a Requested Data Rate (RDR) that may be communicated to the base station 101 from the mobile stations 103 over a Data Rate Control (DRC) channel. In this case the value R(k) would be equivalent to the RDR. The mobile may determine the proper rate to request based on C/I values measured at the receiver and errors in the previously transmitted data. In an alternate embodiment, the CSI may be the reported C/I values as measured at the mobile stations 103. The base station 101 would then determine a supportable data rate and from that the nominal projected data rate based on those C/I values. The mobile stations 103 or the base station 101 may use a variety of methods to determine the supportable data rate from the channel conditions. An example of such a method is given in D. W. Paranchych and M. Yavuz, "A hod for outer loop rate control in high data rate wireless networks," in *Proc. IEEE Vehicular Technology Conf* (VTC 2002-Fall), Vancouver, Canada, September 2002, vol. 3, pp. 1701-1705. In yet a further embodiment, different mobile stations may use different channel state indicators.

In another embodiment, it is assumed that packets can be re-transmitted if errors occur, as in the TIA/EIA/IS-856 standard. In this case, the projected average throughput updates can be performed in step 209 according to the following equation:

$$\overline{R}(k, n+1) = \begin{cases} (1-\beta)\cdot \overline{R}(k,n) + \beta \cdot R_{\max}(k) & \text{if a new packet transmission} \\ (1-\beta)\cdot \overline{R}(k,n) + 0 & \text{if a packet re-transmission} \end{cases} \quad (3)$$

In equation (3), $R_{max}(k)$ is the maximum possible data rate for the packet transmitted to user k, which occurs if the packet is received after only one transmission attempt. The projected average throughput is only updated with that value if a new packet transmission is scheduled for user k. If a re-transmission is scheduled, the projected average throughput is updated with a value of zero. The maximum possible data rate is again determined from the CSI.

If K<M at step 210, the processing continues to step 211 to update the projected average throughput $\overline{R}$ for the (M–K) users in the pool of M active users with data pending who were not scheduled for transmission. The projected average throughput update for non-scheduled users is performed according to:

$$\overline{R}(i,n+1)=(1-\beta)\cdot \overline{R}(i,n), \text{ for } i=1, \ldots, (M-K) \quad (4)$$

Here, the nominal data rate is assumed to be zero for the purposes of updating the projected average throughput for the priority function values of the non-scheduled users.

The updated projected average throughput values will result in updated priority function values. When processing eventually returns to step 205, the updated priority function values will be used to continue scheduling users that still have data pending.

Figure 3:
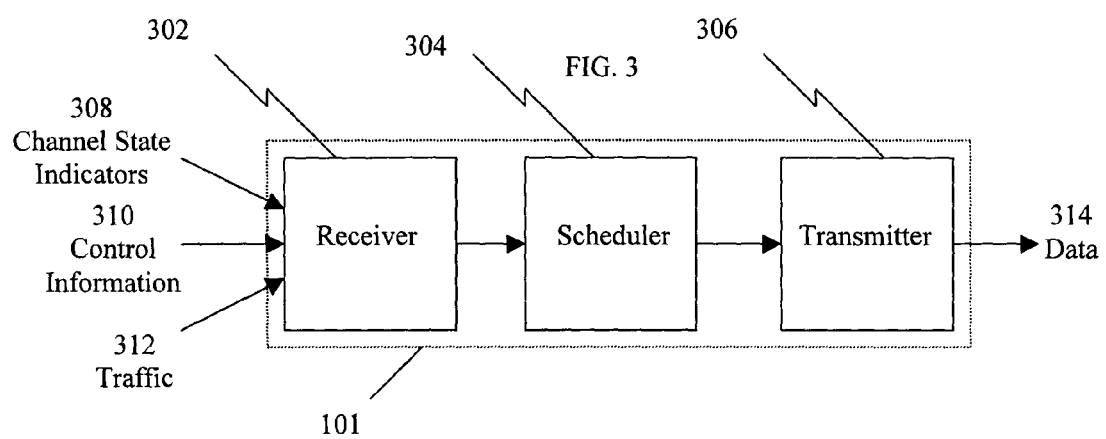
FIG. 3 illustrates in block diagram form a base station.

FIG. 3 shows base station 101 in more detail, including the signals received, processed, and transmitted. The receiver 302 of the base station 101 receives a channel state indicator 308 (e.g. a RDR or a C/I value) from multiple mobile stations 103. Control information 310 is also received from at least the mobile stations 103, and possibly a base station controller (BSC) (not shown). Traffic 312 is received by the receiver 302 from a network, such as the Internet. In response to these incoming signals, the scheduler 304 schedules the data packets, and the transmitter 306 transmits data 314 to the mobile stations 103. It should be noted that in this diagram, the mobile stations 102 requiring real-time processing have been ignored.

Figure 4:
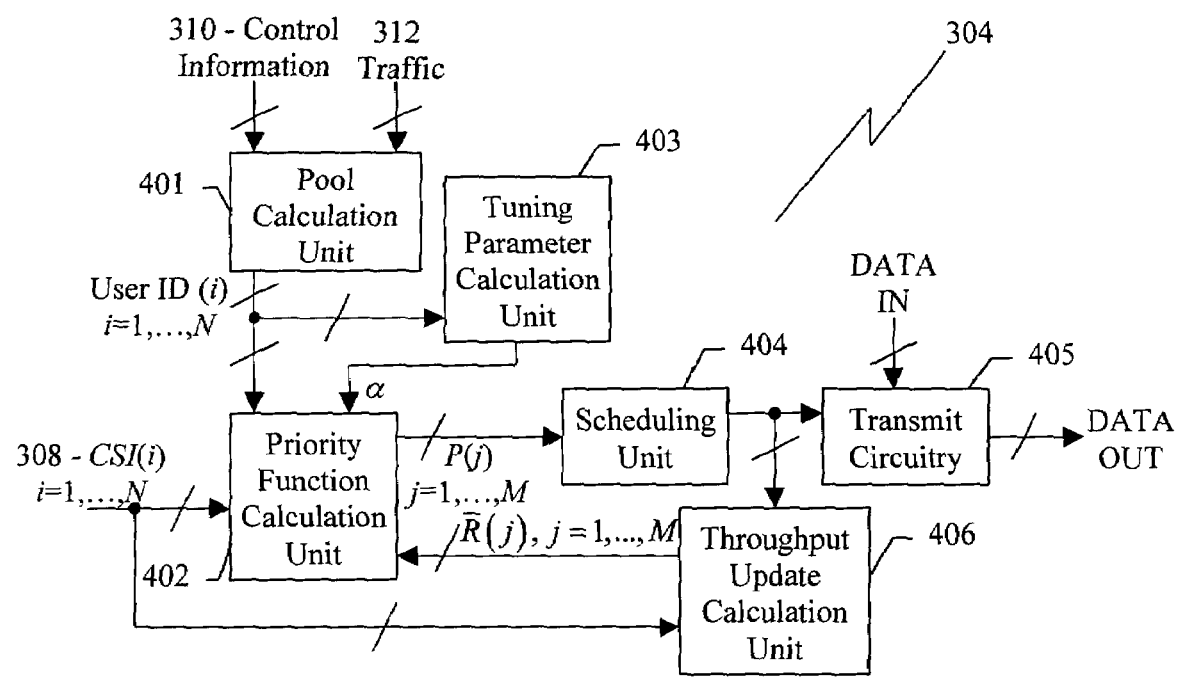
FIG. 4 illustrates in block diagram form the scheduler portion of a base station.

FIG. 4 shows the scheduler 304 in more detail. Included in base station 101 is a pool calculation unit 401 that determines the number of active mobile stations 103 and their identifications. The pool calculation unit 401 receives control information from the mobile stations 103 and possibly a BSC (not shown) and also receives traffic from a network (not shown). In response, the pool calculation unit 401 determines the user identification information of the mobile units 103 and provides those identifiers to a priority function calculation unit 402 and a tuning parameter calculation unit 403. Recall that although the mobile stations 103 communicate with the base station 101, not all of the mobile stations 103 may have data pending. However, the pool calculation unit 401 still provides user identification information for all N active users to the priority function calculation unit 402 and the tuning parameter calculation unit 403.

The tuning parameter calculation unit 403 determines the value of the tuning parameter $\alpha$ in the range of 0 to 1 inclusive and provides that value to the priority function calculation unit 402. The priority function calculation unit 402 also receives channel state information from the mobile stations 103. That channel state information is used to calculate a priority function value for each user according to equation (1). The priority function value P(j) is provided to a scheduling unit 404 for each active user j=1, . . . , M with data pending. The scheduling unit 404 then determines a schedule for K out of the M users based on the values of P(j). The scheduling unit 404 provides the schedule information to transmit circuitry 405. DATA IN is also provided to the transmit circuitry 405, which then transmits the data according to the scheduling information to create DATA OUT. A calculation unit 406 receives the channel state indicators from the mobile stations 103 and the schedule information from the scheduling unit 404 to update the projected average throughput of the N active users. The projected average throughput of the scheduled users are updated by equation (2) or (3), while the non-scheduled users are updated by equation (4). The filter parameter $\beta$ used in the updates can be adjusted for each user to account for the QoS or the velocity of the user. The updated throughput are then provided back to the priority function calculation unit 402 to update the values of the priority functions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a Compact-Disk ROM (CD-ROM), a or any other form of storage medium known in the art. The storage medium may be coupled to the processor such the processor can read information from, and write information to, the storage medium, although the storage medium may also be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the invention. Thus, the present invention is not intended to be limited to the embodiments shown herein but is to be accorded the widest scope consistent with the principles and novel features disclosed herein.

What is claimed is:

1. In a wireless communication system adapted for packet data transmissions, a method comprising:

receiving a channel state indicator CSI for each mobile station in a pool of mobile stations;

determining a tuning parameter $\alpha$ in the range of 0 to 1 inclusive;

calculating a projected average throughput value $\overline{R}$ for each mobile station in the pool of mobile stations as a function of the CSI;

calculating the average value $\overline{R}_{av}$ of the projected average throughput values for at least a portion of the pool of mobile stations;

calculating respective priority functions for each mobile station as $CSI \times [\alpha/\overline{R} + (1-\alpha)/\overline{R}_{av}]$; and scheduling transmissions to the mobile stations according to the priority functions.

2. The method of claim 1, wherein calculating the priority function further comprises calculating the priority function as a monotonic function of $CSI \times [\alpha/\overline{R}+(1-\alpha)/\overline{R}_{av}]$.

3. The method of claim 1, wherein each of the channel state indicators is a requested data rate received from one of the pool of mobile stations.

4. The method of claim 1, wherein each of the channel state indicators is a carrier-to-interference ratio received from one of the pool of mobile stations.

5. The method of claim 1, further comprising transmitting data to the pool of mobile stations in response to scheduling decisions.

6. The method of claim 1, further comprising updating the priority functions of scheduled mobile stations as a function of the channel state indicator.

7. The method of claim 1, further comprising updating the priority functions of non-scheduled mobile stations assuming the channel state indicator is equal to zero.

8. A method for scheduling packet transmissions in a wireless communication system, comprising:
   determining a pool of users;
   determining a tuning parameter $\alpha$ in the range of 0 to 1 inclusive;
   receiving channel state indicators for at least a section of the pool of users;
   calculating a priority function for the section of the pool of users;
   scheduling a first subset of users who have data transmissions pending from the section of the pool of users; and
   updating the priority functions of the first subset of users based on the channel state indicators multiplied by a function of the tuning parameter, the average projected throughput for the first subset of users, and the average projected throughput value across all users in the section of the pool of users.

9. The method of claim 8, further comprising updating a second subset of users within the section of the pool of users different from the first subset of users using a nominal data rate of zero.

10. The method as in claim 8, wherein the section of the pool of users are users having data pending.

11. The method as in claim 10, wherein the first subset of users comprises one user.

12. A base station apparatus, comprising:
   a processor, and;
   a memory module coupled to the processor, the memory module operative to store a plurality of computer readable instructions, comprising:
   a first set of instructions to obtain channel state indicators CSI for the mobile stations;
   a second set of instructions to determine the value of a tuning parameter $\alpha$ within the range of 0 to 1 inclusive;
   a third set of instructions to calculate the projected average throughput value $\overline{R}$ for each mobile station as a function of the channel state indicator for that mobile;
   a fourth set of instructions to calculate the average value $\overline{R}_{av}$ of the projected average throughput values $\overline{R}$;
   a fifth set of instructions to calculate a priority function for the mobile stations, wherein the priority function is a function of $CSI \times [\alpha/\overline{R}+(1-\alpha)/\overline{R}_{av}]$; and
   sixth set of instructions to schedule transmissions to the mobile stations according to the priority functions.

13. The method of claim 12, wherein the instructions further comprise a seventh set of instructions to calculate the priority function as a monotonic function of $CSI \times [\alpha/\overline{R}+(1-\alpha)/\overline{R}_{av}]$.

14. A method for scheduling packet transmissions in a wireless communication system, wherein the wireless communications system incorporates a base station and a pool of mobile stations, the method comprising the steps of:
   receiving a channel state indicator for each of plural mobile stations in the pool of mobile stations;
   projecting average throughput for each of the plural mobile stations.
   finding an average of the projected average throughputs for the plural mobile stations; and
   scheduling transmissions to the plural mobile stations according to a priority function for each mobile station that is dependent upon the channel state information for the mobile station, the projected average throughput for the mobile station and the average of the projected average throughputs, to obtain a balance between high throughput for specific mobile stations and fairness to the plural mobile stations.

15. The method of claim 14 in which each priority function incorporates a tuning parameter $\alpha$ whose value varies the weight assigned to the projected average throughput for the mobile station and the average of the projected average throughput in determining the scheduling of transmissions.

16. The method of claim 15 in which throughput of the scheduled transmissions varies linearly with the tuning parameter.

17. The method of claim 14 in which each priority function is a function of $CSI \times [\alpha/\overline{R}+(1-\alpha)/\overline{R}_{av}]$ where CSI is the channel state indicator from the respective mobile station, $\alpha$ has a value between 0 and 1, $\overline{R}$ is a projected average throughput value for the mobile station as a function of the CSI, and $\overline{R}_{av}$ is the average of the projected average throughput values for plural mobile stations.

18. The method of claim 17 in which scheduling transmission to the plural mobile stations comprises:
   scheduling a first subset of the mobile stations who have data transmissions pending; and
   updating the priority functions of the plural mobile stations.

19. The method of claim 18 in which updating the priority function of a mobile station is based on the channel state indicator of the mobile station multiplied by a function of the tuning parameter, the projected average throughput for the mobile station and the average of the projected average throughput for the plural mobile stations.

* * * * *

UNITED STATES PATENT AND TRADEMARK OFFICE
CERTIFICATE OF CORRECTION

PATENT NO. : 7,295,513 B2
APPLICATION NO. : 10/669151
DATED : November 13, 2007
INVENTOR(S) : R.C. Elliott et al.

Page 1 of 1

It is certified that error appears in the above-identified patent and that said Letters Patent is hereby corrected as shown below:

| COLUMN | LINE | ERROR |
|---|---|---|
| 9 (Claim 2, | 3 line 3) | "$_{\alpha v}$]." should read --$_{av}$].-- |
| 10 (Claim 12, | 4 line 18) | "sixth set" should read --a sixth set-- |
| 10 (Claim 13, | 8 line 3) | "CSI x[α/" should read --CSIx[α/-- |
| 10 (Claim 15, | 32 line 5) | "average throughput" should read --average throughputs-- |
| 10 (Claim 17, | 38 line 2) | "]where" should read --] where-- |
| 10 (Claim 19, | 55 line 6) | "average throughput" should read --average throughputs-- |

Signed and Sealed this

Sixteenth Day of September, 2008

JON W. DUDAS
*Director of the United States Patent and Trademark Office*